United States Patent [19]
Stranne

[11] 3,903,457
[45] Sept. 2, 1975

[54] DEVICE FOR PREVENTING UNJUSTIFIED TRIPPING OF A DIRECT-CURRENT APPARATUS WHEN SWITCHED IN TO A DIRECT-CURRENT NETWORK OR IN THE CASE OF AN EARTH FAULT IN THE NETWORK

[75] Inventor: Gunnar Stranne, White Plains, N.Y.

[73] Assignee: Allmanna Svenska Elektriska Aktiebolaget, Vasteras, Sweden

[22] Filed: Oct. 23, 1973

[21] Appl. No.: 408,818

[30] Foreign Application Priority Data
Nov. 22, 1972 Sweden.............................. 15164/72

[52] U.S. Cl............................. 317/49; 317/DIG. 6
[51] Int. Cl.[2]........................................... H02H 9/04
[58] Field of Search.......... 317/49, 9 D, 150, 141 R, 317/DIG. 6

[56] References Cited
UNITED STATES PATENTS

| | | | |
|---|---|---|---|
| 2,397,337 | 3/1946 | Clough | 317/49 X |
| 2,835,734 | 5/1958 | Fisher | 317/150 X |
| 3,109,965 | 11/1963 | Winchel | 317/DIG. 6 |
| 3,551,751 | 12/1970 | Twellsiek et al. | 317/DIG. 6 |
| 3,665,901 | 5/1972 | Monpetit et al. | 317/DIG. 6 |
| 3,668,374 | 6/1972 | Gamble | 317/DIG. 6 |

FOREIGN PATENTS OR APPLICATIONS

| | | | |
|---|---|---|---|
| 1,175,321 | 8/1964 | Germany | 317/DIG. 6 |

*Primary Examiner*—James D. Trammell

[57] ABSTRACT

In order to prevent unwanted tripping of a direct current apparatus, such as a relay, when it is switched in to a direct current network or in the case of an earth fault, a safety circuit is connected in parallel with the apparatus which includes a capacitor which is so large in relation to the other capacitances in the switched-in circuit that the voltage which is taken up by the capacitor in the switching operation is less than the tripping value of the apparatus. A diode is provided in a connection of the safety circuit to the apparatus to prevent the fall of the relay from being caused by the capacitor.

2 Claims, 1 Drawing Figure

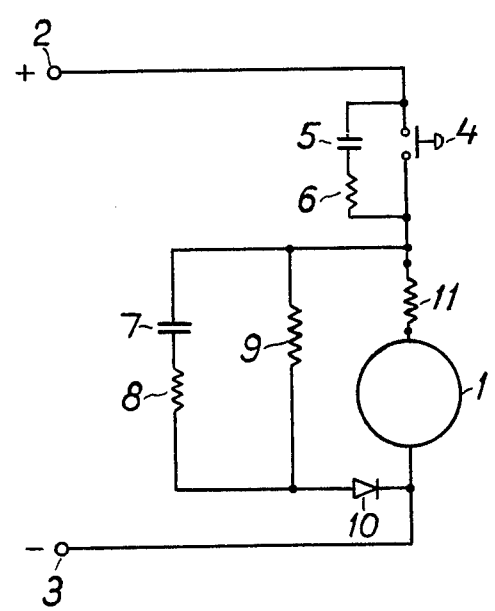

DEVICE FOR PREVENTING UNJUSTIFIED TRIPPING OF A DIRECT-CURRENT APPARATUS WHEN SWITCHED IN TO A DIRECT-CURRENT NETWORK OR IN THE CASE OF AN EARTH FAULT IN THE NETWORK

BACKGROUND OF THE INVENTION

1. Field of the Invention

When a circuit which contains a direct-current apparatus, for example a relay, and which has great conductive capacitance, is connected to a direct-current source, a charging current passes through the apparatus. When an earth fault arises in the direct-current circuit, a discharging current passes through the apparatus. This current can be so great that the apparatus trips for a short moment, and, if the apparatus is a relay, an unintentional closing operation may take place. The capacitance in the circuit may consist of conductive capacitance and disturbance-protecting capacitors or the like.

SUMMARY OF THE INVENTION

The arrangement includes a safety circuit connected in parallel with an apparatus, such as a relay, which includes a capacitor having a capacitance large enough in relation to the other capacitors in the switched-in circuit to cause the voltage to be taken up by the capacitor in the switching operation to be less than the tripping value of the apparatus.

BRIEF DESCRIPTION OF THE DRAWINGS

The present invention relates to a protection device for preventing such unjustified tripping. What characterizes the invention is clear from the claims.

The accompanying drawing illustrates a wiring diagram for the device.

DESCRIPTION OF THE PREFERRED EMBODIMENTS

The apparatus, relay or the like, which is to be protected against unintentional tripping is designated 1. It is to be connected to a direct-current network by terminals 2 and 3. The circuit which contains the relay has an operating contact 4 with a quenching circuit containing a capacitor 5 and a resistor 6. When the relay is switched in to the direc-current network, or in the case of an earth fault in the network, this capacitor will be charged or discharged and the resultant current may be sufficient to cause an instantaneous, unintentional tripping of the relay. In addition to the capacitance of the capacitor 5 there is also the capacitance in the conductors leading from the terminals 2 and 3 to the apparatus.

In order to avoid this, a safety circuit is connected in parallel with the relay, said circuit comprising a capacitor 7 in series with a resistor 8. The circuit is completed with a resistor 9 for the discharging of the capacitor. The capacitance of the capacitor 7 is to be so great with respect to the other capacitances in the device, and especially the capacitance of the capacitor 5, that the voltage, which is taken up by the capacitor 7 in the switching operation, is less than the tripping value of the relay. A blocking diode 10 is included in the connection of the safety circuit to the relay in order to prevent the fall of the relay from being caused by the capacitor in the safety circuit. The relay must be switched in by way of a resistor 11.

The invention therefore operates in such a way that the energy pulse which passes through the circuit, when it is switched in to the network and in the case of an earth fault, is absorbed by the capacitor 7 in the safety circuit, and that the voltage which the capacitor will then receive is insufficient to influence the relay.

I claim:

1. A device for preventing unwanted tripping of a direct-current apparatus when switched in to a direct-current network and in the case of an earth fault, a safety circuit connected in parallel with the apparatus (1), said safety circuit comprising a capacitor (7), the capacitance of which is so great in relation to the other capacitances in the switched-in circuit that the voltage, which is taken up by the capacitor (7) in the switching operation, is less than the tripping value of the apparatus.

2. A device according to claim 1, in which the apparatus is a relay, having a diode (10) in the connection of the safety circuit to the apparatus in order to prevent the fall of the relay from being caused by the capacitor (7) in the safety circuit.

* * * * *